United States Patent
Hu et al.

(10) Patent No.: US 11,814,132 B1
(45) Date of Patent: Nov. 14, 2023

(54) BICYCLE OPERATING DEVICE

(71) Applicant: AD-II Engineering Inc., Taichung (TW)

(72) Inventors: Kai-Hung Hu, Taichung (TW); Chung-Ren Chang, Taichung (TW)

(73) Assignee: AD-II ENGINEERING INC., Taichung (TW)

( * ) Notice: Subject to any disclaimer, the term of this patent is extended or adjusted under 35 U.S.C. 154(b) by 0 days.

(21) Appl. No.: 18/084,707

(22) Filed: Dec. 20, 2022

(51) Int. Cl.
*B62K 23/06* (2006.01)
*B62M 25/04* (2006.01)
*B62L 3/02* (2006.01)
*B62L 1/00* (2006.01)

(52) U.S. Cl.
CPC ............... *B62L 3/023* (2013.01); *B62L 1/005* (2013.01)

(58) Field of Classification Search
CPC ............ B62L 3/023; B62L 1/005; B62L 3/02; B62M 25/04
See application file for complete search history.

(56) References Cited

U.S. PATENT DOCUMENTS

| | | | |
|---|---|---|---|
| 9,233,730 B2 * | 1/2016 | Kariyama | B62L 3/023 |
| 2014/0174237 A1 * | 6/2014 | Watarai | B60T 11/18 |
| | | | 74/489 |
| 2015/0135881 A1 * | 5/2015 | Dal Pra | B62K 23/02 |
| | | | 74/491 |
| 2018/0015980 A1 * | 1/2018 | Kosaka | B62M 25/04 |
| 2022/0048591 A1 * | 2/2022 | Hsieh | B62K 23/06 |

FOREIGN PATENT DOCUMENTS

| | | | |
|---|---|---|---|
| CN | 104648587 A * | 5/2015 | B62L 3/023 |
| EP | 2058219 A2 * | 5/2009 | B62M 25/04 |
| TW | I391292 B | 4/2013 | |

OTHER PUBLICATIONS

Translation of CN 104648587 A, Giuseppe, May 27, 2015 (Year: 2015).*

* cited by examiner

*Primary Examiner* — Vinh Luong
(74) *Attorney, Agent, or Firm* — Muncy, Geissler, Olds & Lowe (57) ABSTRACT

A bicycle operating device includes a main body, a speed shafting unit, a brake lever, a fluid pressure generating assembly, a first operation assembly and a second operation assembly. The speed shafting unit is disposed on the main body and includes a reel and a shaft. The reel is disposed on the shaft. The brake lever is rotatably connected to the main body. The fluid pressure generating assembly is disposed on the main body and includes a cylinder, a piston assembly and a reservoir. The reservoir is located above the cylinder.

10 Claims, 7 Drawing Sheets

000
BICYCLE OPERATING DEVICE

BACKGROUND OF THE INVENTION

Field of the Invention

The present invention relates to a bicycle operating device.

Description of the Prior Art

A speed shifting device for a bicycle is used to change the gear ratio to meet the needs of low-speed or high-speed riding. The speed shifting device is controlled by operating a speed operating device on the bicycle bended handlebar, such as one disclosed in TWI391292. This conventional speed operating device performs the controlling of speed changing by swinging the brake lever; however, it is easy to accidentally shift the gear ratio when braking, or easy to accidentally brake during shifting of the gear ratio. In addition, this conventional speed operating device for bended handlebar also has an insufficient braking force since it only relies on that the brake lever to pull the brake cable.

The present invention is, therefore, arisen to obviate or at least mitigate the above-mentioned disadvantages.

SUMMARY OF THE INVENTION

The main object of the present invention is to provide a bicycle operating device which provides a large and reliable braking force and is easy and convenient to operate.

To achieve the above and other objects, a bicycle operating device configured to be mounted to a bended handlebar of a bicycle is provided, including: a main body, extending in a first direction, the main body including a first end portion and a second end portion arranged in the first direction, the second end portion being configured to be mounted to the bended handlebar; a speed shifting unit, disposed on the main body, including a reel and a shaft, the reel being connected to the shaft, the reel being configured for a shifting cable to be reeled in or out, an axial direction of the shaft being defined as a first rotation axis, the reel being reversibly rotatable about the first rotation axis; a brake lever, rotatably connected to the main body and adjacent to the first end portion, the brake lever being rotatable about a second rotation axis, a reference plane being defined as to be perpendicular to the second rotation axis and to pass a center of the reel; a fluid pressure generating assembly, disposed on the main body and adjacent to the first end portion, including a cylinder, a piston assembly and a reservoir, the cylinder and the reservoir being located above the second rotation axis, the reservoir being located above the cylinder, wherein the brake lever drives the piston assembly to move along the cylinder to generate a control fluid pressure to drive a brake assembly; a first operation assembly, reversibly and rotatably connected to the shaft for driving the reel to pull shifting cable, the first operation assembly including a first press region; a second operation assembly, reversibly and rotatably connected to the shaft for driving the reel to reverse to reel out the shifting cable, the second operation assembly including a second press region; wherein in an un-operated state the first press region and the second press region are located by a side of the reference plane remote from the bicycle frame; wherein when the first operation assembly is operated, the first press region moves toward the reference plane; wherein when the second operation assembly is operated, the second press region moves toward the reference plane; wherein when the first press region moves toward the reference plane, the second press region is not movable with the first press region; wherein the second press region is located between the first rotation axis and the first press region.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
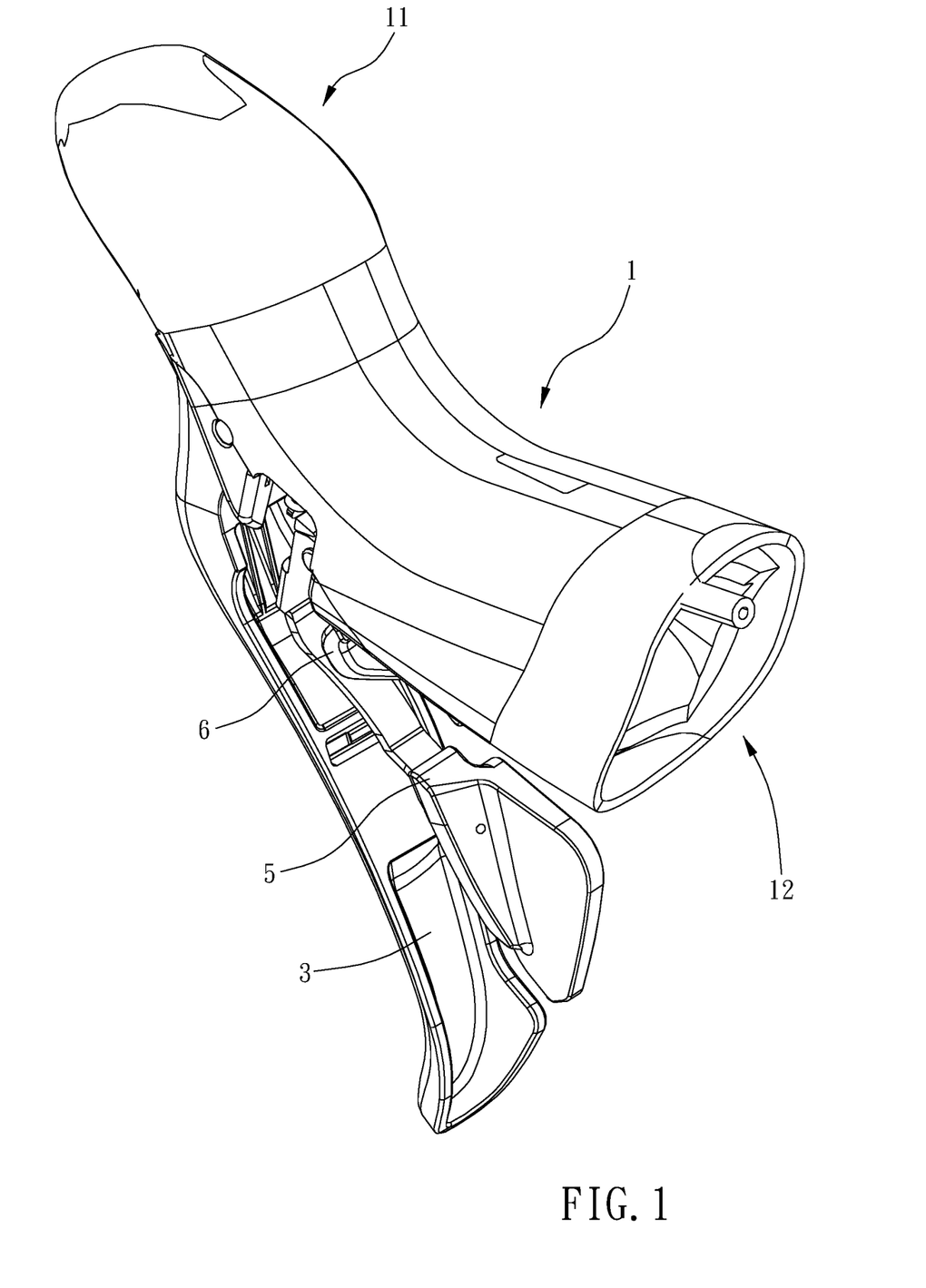
FIG. 1 is a stereogram of a preferable embodiment of the present invention.
Figure 2:
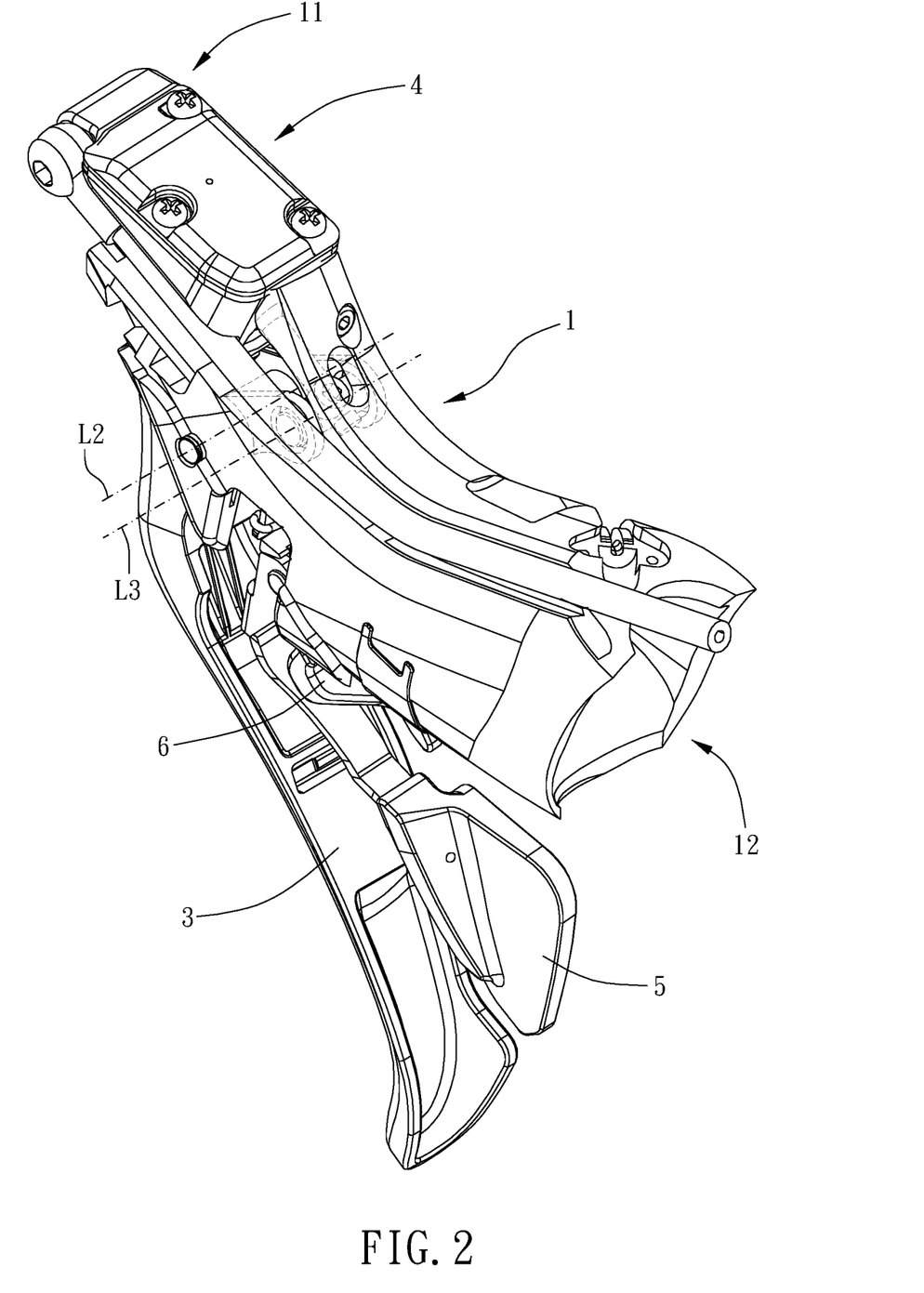
FIG. 2 is another stereogram of a preferable embodiment of the present invention.
Figure 3:
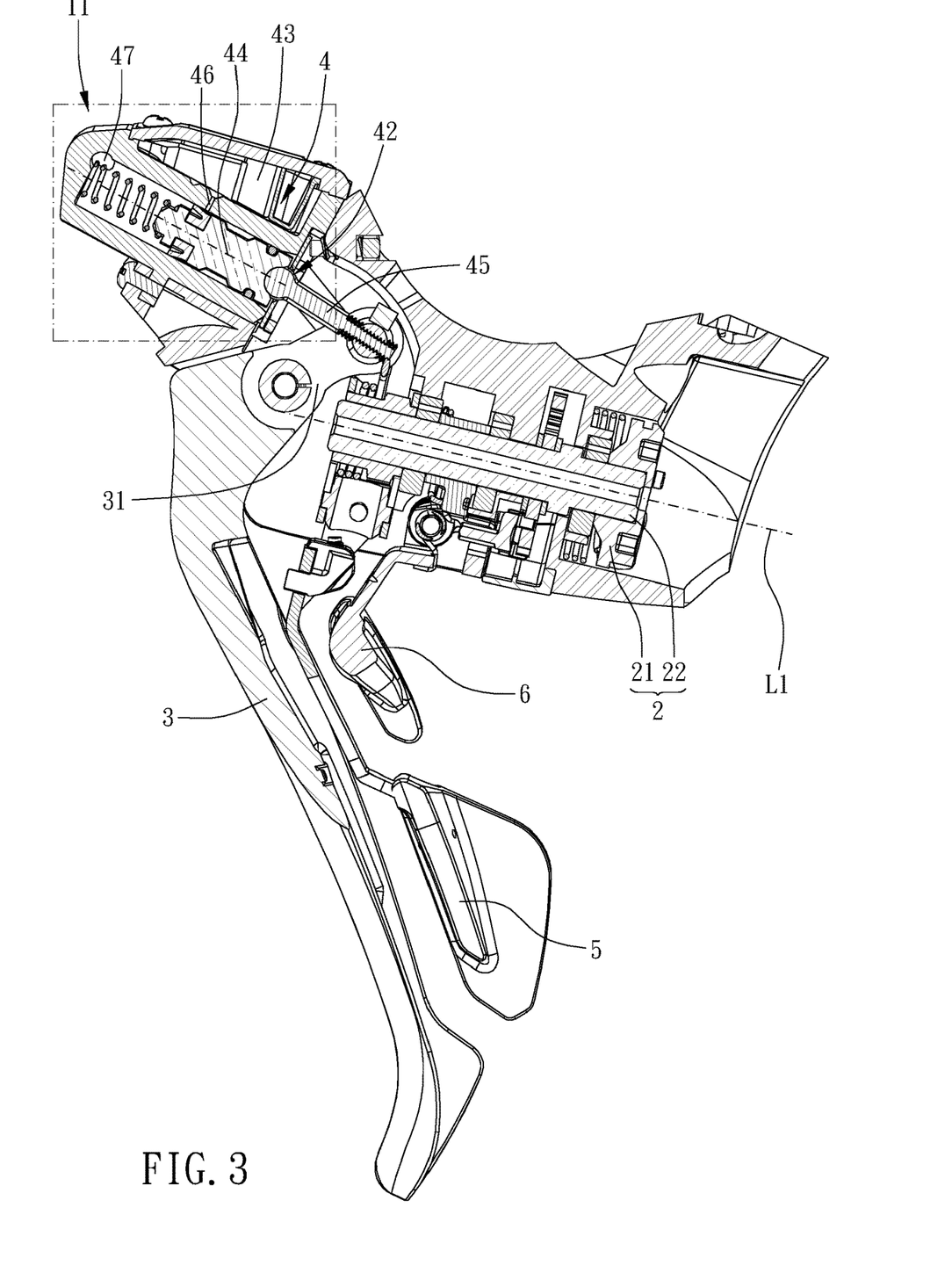
FIG. 3 is a breakdown drawing of a preferable embodiment of the present invention.
Figure 4:
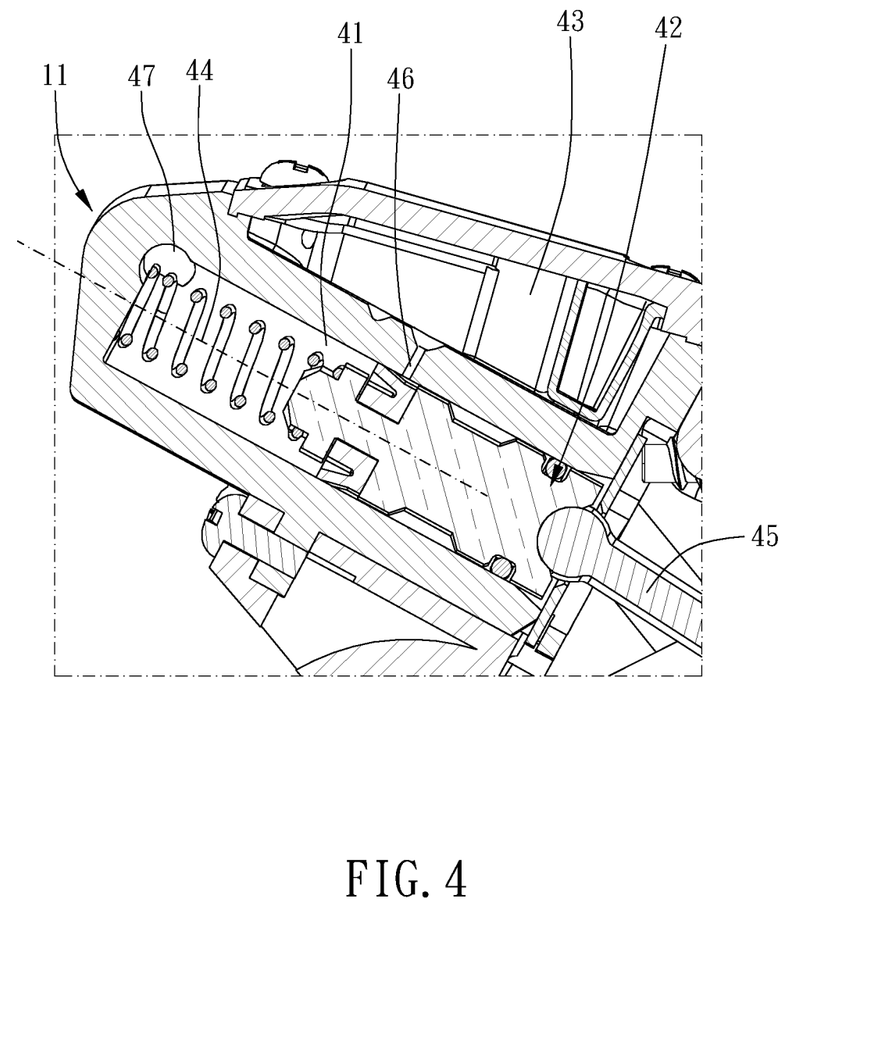
FIG. 4 is a partial enlargement of FIG. 3.
Figure 5:
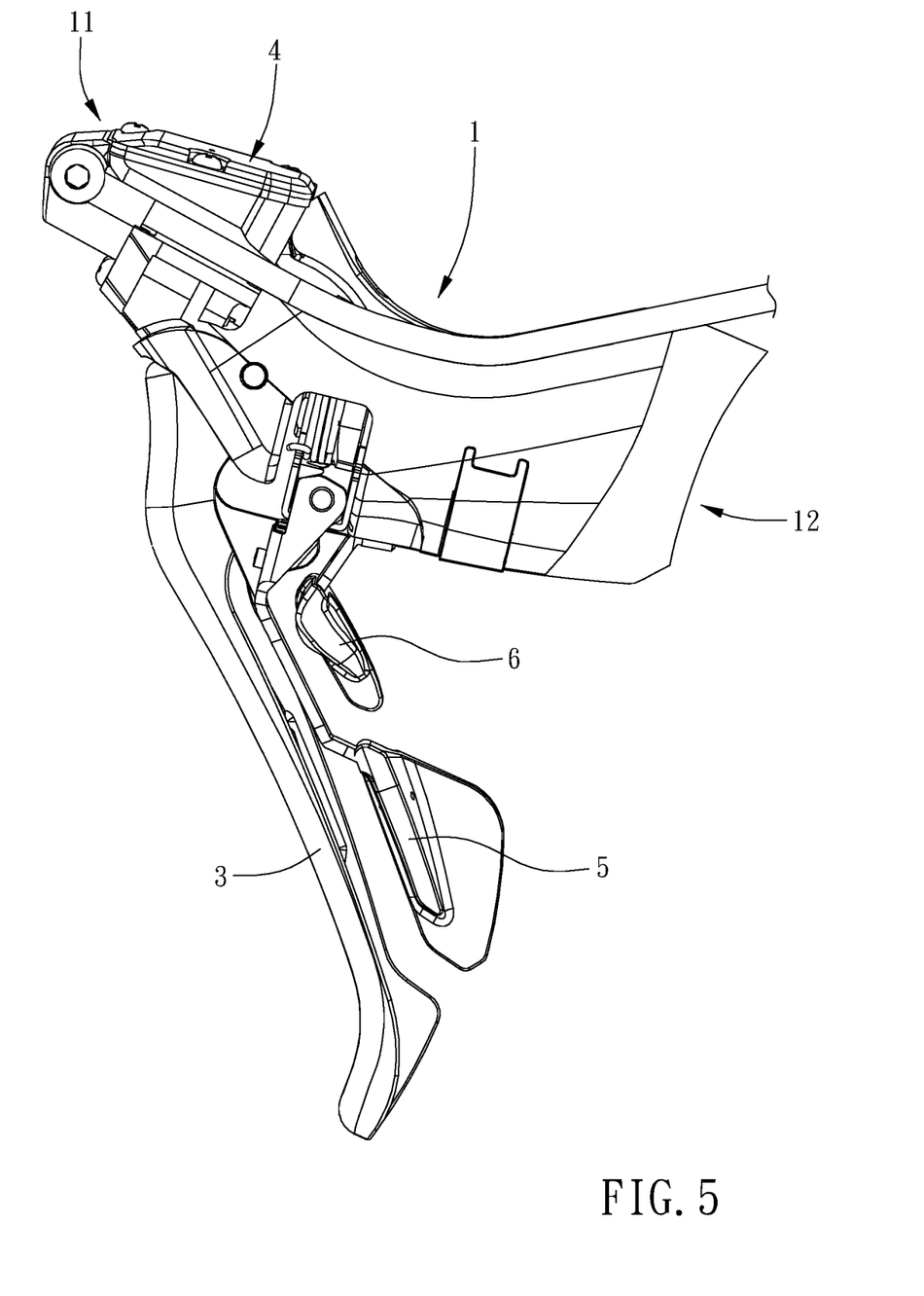
FIG. 5 is a lateral side view of a preferable embodiment of the present invention.
Figure 6:
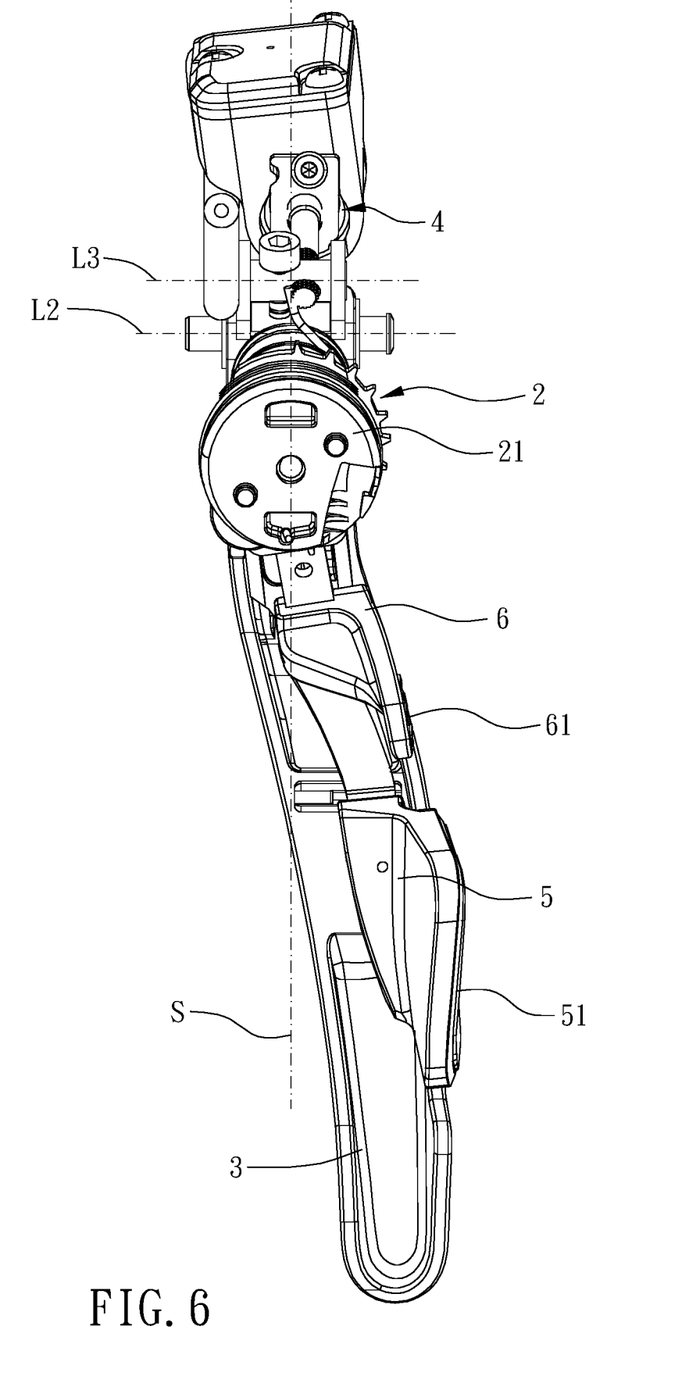
FIG. 6 is a rear side view of a preferable embodiment of the present invention.
Figure 7:
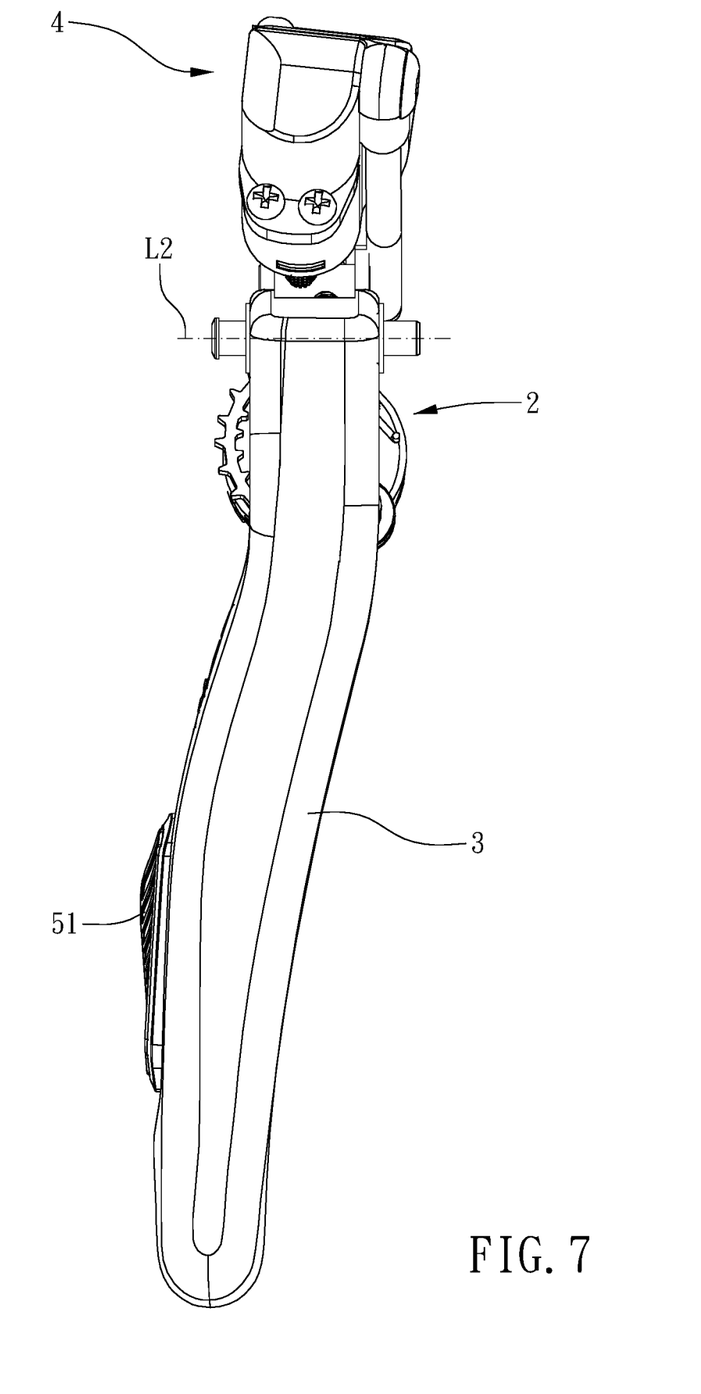
FIG. 7 is a front side view of a preferable embodiment of the present invention.

Please refer to FIGS. 1 to 7 for a preferable embodiment of the present invention. A bicycle operating device of the present invention is configured to be mounted to a bended handlebar of a bicycle. The bicycle operating device includes a main body 1, a speed shifting unit 2, a brake lever 3, a fluid pressure generating assembly 4, a first operation assembly 5 and a second operation assembly 6.

The main body 1 extends in a first direction, the main body 1 includes a first end portion 11 and a second end portion 12 arranged in the first direction, and the second end portion 12 is configured to be mounted to the bended handlebar.

The speed shifting unit 2 is disposed on the main body 1 and includes a reel 21 and a shaft 22. The reel 21 is connected to the shaft 22, the reel 21 is configured for a shifting cable to be reeled in or out, an axial direction of the shaft 22 is defined as a first rotation axis L1, and the reel 21 is reversibly rotatable about the first rotation axis L1. In this embodiment, the reel 21 is disposed around and movable with the shaft 22.

The brake lever 3 is rotatably connected to the main body 1 and adjacent to the first end portion 11, the brake lever 3 is rotatable about a second rotation axis L2, and a reference plane S is defined as to be perpendicular to a second rotation axis L2 and to pass a center of the reel 21.

The fluid pressure generating assembly 4 is disposed on the main body 1 and adjacent to first end portion 11. The fluid pressure generating assembly 4 includes a cylinder 41, a piston assembly 42 and a reservoir 43. The cylinder 41 and the reservoir 43 are located above the second rotation axis L2, and the reservoir 43 is located above the cylinder 41. The brake lever 3 drives the piston assembly 42 to move along the cylinder 41 to generate a control fluid pressure to drive a brake assembly. Since the brake assembly is driven by the control fluid pressure to perform braking, it provides a large and reliable braking force compared with the conventional brake assembly on the bended handlebar.

The first operation assembly 5 is reversibly and rotatably connected to the shaft 22 for driving the reel 21 to pull shifting cable, and the first operation assembly 5 includes a first press region 51.

The second operation assembly 6 is reversibly and rotatably connected to the shaft 22 for driving the reel 21 to reverse to reel out shifting cable, and the second operation assembly 6 includes a second press region 61. In this embodiment, the first operation assembly 5 is connected to an end of the main body 1 and located between the brake lever 3 and the second operation assembly 6.

In an un-operated state, the first press region 51 and the second press region 61 are located by a side of the reference plane S remote from the bicycle frame. When the first operation assembly 5 is operated, the first press region 51 moves toward the reference plane S. When the second operation assembly 6 is operated, the second press region 61 moves toward the reference plane S. When the first press region 51 moves toward the reference plane S, the second press region 61 is not movable with the first press region 51. The second press region 61 is located between the first rotation axis L1 and the first press region 51. As such, the first press region 51 and the second press region 61 are located by the side of the reference plane S remote from the bicycle frame, the first press region 51 or the second press region 61 is easy and convenient to be pressed toward the bicycle frame by an user's index finger or middle finger to move. The first press region 51 and the second press region 61 are independently swingable so that it can prevent the first press region 51 and the second press region 61 from interfering with each other. Besides, the first press region 51 and the second press region 61 are located lower than the first rotation axis L1, which is ergonomic.

Specifically, the reference plane S passes through the cylinder 41 and the reservoir 43, the cylinder 41 defines a cylinder axis 44, the piston assembly 42 moves along the cylinder axis 44, and an extension of the cylinder axis 44 passes through the reel 21 and the shaft 22 so that the cylinder 41 and the reservoir 43 are relatively centered.

Specifically, the piston assembly 42 includes a rod member 45, an end of the rod member 45 is slidably inserted within the cylinder 41, and another end of the rod member 45 is connected to the brake lever 3 and swingable about a third rotation axis L3. The brake lever 3 includes an arm 31, an end of the arm 31 is located on the second rotation axis L2, another end of the arm 31 is located on the third rotation axis L3, and the reference plane S is transverse to the third rotation axis L3. In this embodiment, the arm 31 and the brake lever 3 are movable with each other, and when the brake lever 3 is pressed, the brake lever 3 drives the arm 31 to move the piston assembly 42 to move along the cylinder 41 for generating the control fluid pressure.

In this embodiment, the cylinder 41 includes a first through hole 46 in communication with the reservoir 43, the cylinder 41 further includes a second through hole 47 extending laterally, and the first through hole 46 is located between the second through hole 47 and the rod member 45. When the fluid in the cylinder 41 decreases, the fluid can be replenished, via the first through hole 46, from the reservoir 43 to the cylinder 41.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A bicycle operating device, including:
   a main body, extending in a first direction, the main body including a first end portion and a second end portion arranged in the first direction;
   a speed shifting unit, disposed on the main body, including a reel and a shaft, the reel being connected to the shaft, an axial direction of the shaft being defined as a first rotation axis, the reel being reversibly rotatable about the first rotation axis;
   a brake lever, rotatably connected to the main body and adjacent to the first end portion, the brake lever being rotatable about a second rotation axis, a reference plane being defined as to be perpendicular to the second rotation axis and to pass a center of the reel;
   a fluid pressure generating assembly, disposed on the main body and adjacent to the first end portion, including a cylinder, a piston assembly and a reservoir, the cylinder and the reservoir being located above the second rotation axis, the reservoir being located above the cylinder, wherein the brake lever drives the piston assembly to move along the cylinder to generate a control fluid pressure to drive a brake assembly;
   a first operation assembly, reversibly and rotatably connected to the shaft for driving the reel, the first operation assembly including a first press region;
   a second operation assembly, reversibly and rotatably connected to the shaft for driving the reel to reverse, the second operation assembly including a second press region;
   wherein in an un-operated state the first press region and the second press region are located by a side of the reference plane;
   wherein when the first operation assembly is operated, the first press region moves toward the reference plane;
   wherein when the second operation assembly is operated, the second press region moves toward the reference plane;
   wherein when the first press region moves toward the reference plane, the second press region is not movable with the first press region;
   wherein the second press region is located between the first rotation axis and the first press region;
   wherein the second rotation axis is transverse to the first rotation axis, and the first operation assembly and the second operation assembly are rotatable about the first rotation axis;
   wherein as viewed in a direction parallel to the second rotation axis, the first operation assembly and the second operation assembly are arranged entirely without overlapping with each other.

2. The bicycle operating device of claim 1, wherein the reel is disposed around and movable with the shaft.

3. The bicycle operating device of claim 1, wherein the reference plane passes through the cylinder and the reservoir.

4. The bicycle operating device of claim 1, wherein the cylinder defines a cylinder axis, the piston assembly moves along the cylinder axis, and an extension of the cylinder axis passes through the reel and the shaft.

5. The bicycle operating device of claim 1, wherein the piston assembly includes a rod member, an end of the rod member is slidably inserted within the cylinder, and another end of the rod member is connected to the brake lever and swingable about a third rotation axis.

6. The bicycle operating device of claim 5, wherein the brake lever includes an arm, an end of the arm is located on the second rotation axis, another end of the arm is located on the third rotation axis, and the reference plane is transverse to the third rotation axis.

7. The bicycle operating device of claim 6, wherein when the brake lever is pressed, the brake lever drives the arm to move the piston assembly to move along the cylinder for generating the control fluid pressure.

8. The bicycle operating device of claim 5, wherein the cylinder includes a first through hole in communication with the reservoir, the cylinder further includes a second through hole extending laterally, and the first through hole is located between the second through hole and the rod member.

9. The bicycle operating device of claim 1, wherein the first press region and the second press region are located lower than the first rotation axis.

10. The bicycle operating device of claim 1, wherein the first operation assembly is connected to an end of the main body and located between the brake lever and the second operation assembly.

* * * * *